United States Patent
Jung et al.

(10) Patent No.: US 10,615,696 B2
(45) Date of Patent: Apr. 7, 2020

(54) ELECTRONIC CIRCUIT PERFORMING BUCK-BOOST CONVERSION USING SINGLE INDUCTIVE ELEMENT

(71) Applicant: SAMSUNG ELECTRONICS CO., LTD., Suwon-si, Gyeonggi-Do (KR)

(72) Inventors: Minyong Jung, Hwaseong-si (KR); Gyeong-Gu Kang, Yuseong-Gu (KR); Gyu-Hyeong Cho, Yuseong-Gu (KR); Hyunseok Kim, Gwacheon-si (KR); Heemun Bang, Seoul (KR); Se-Un Shin, Yuseong-Gu (KR); Chang Seok Chae, Seongnam-si (KR)

(73) Assignees: Samsung Electronics Co., Ltd., Suwon-si, Gyeonggi-do (KR); Korea Advanced Institute of Science and Technology, Yuseong-gu, Daeleon (KR)

( * ) Notice: Subject to any disclaimer, the term of this patent is extended or adjusted under 35 U.S.C. 154(b) by 0 days.

(21) Appl. No.: 16/228,363

(22) Filed: Dec. 20, 2018

(65) Prior Publication Data
US 2019/0252978 A1    Aug. 15, 2019

(30) Foreign Application Priority Data
Feb. 14, 2018    (KR) .................... 10-2018-0018223

(51) Int. Cl.
*H02M 3/158*    (2006.01)
*G05F 1/577*    (2006.01)
*H02M 1/00*    (2006.01)

(52) U.S. Cl.
CPC .......... *H02M 3/1582* (2013.01); *G05F 1/577* (2013.01); *H02M 2001/009* (2013.01); *H02M 2001/0054* (2013.01)

(58) Field of Classification Search
CPC ............ H02M 3/1582; H02M 3/1584; H02M 2001/008; H02M 3/285; G05F 1/577
(Continued)

(56) References Cited

U.S. PATENT DOCUMENTS

| 4,523,269 | A | * | 6/1985 | Baker | ............... H02M 5/14 |
| | | | | | 307/110 |
| 7,432,614 | B2 | * | 10/2008 | Ma | ............... H02M 3/158 |
| | | | | | 307/31 |

(Continued)

FOREIGN PATENT DOCUMENTS

| KR | 20080073173 | 8/2008 |
| KR | 1026995 B1 | 4/2011 |

*Primary Examiner* — Alex Torres-Rivera
(74) *Attorney, Agent, or Firm* — Volentine, Whitt & Francos, PLLC

(57) ABSTRACT

An electronic circuit includes an inductive element, a capacitive element, and switch elements. A first end of the inductive element is connected to an input voltage. A first end of a first switch element is connected to the first end of the inductive element. The capacitive element is connected between a second end of the first switch element and a second end of the inductive element. A second switch element is connected between the second end of the first switch element and a reference voltage. A third switch element is connected between the second end of the inductive element and the reference voltage. A fourth switch element is connected between the second end of the inductive element and a first output voltage. A fifth switch element is connected between the second end of the inductive element and a second output voltage.

20 Claims, 10 Drawing Sheets

(58) Field of Classification Search
USPC .................................. 323/267, 268, 271, 272
See application file for complete search history.

(56) References Cited

U.S. PATENT DOCUMENTS

| | | | | |
|---|---|---|---|---|
| 7,538,527 | B2* | 5/2009 | O'Driscoll | H02M 3/33561 |
| | | | | 323/222 |
| 8,531,165 | B2* | 9/2013 | Chen | H02M 3/158 |
| | | | | 323/268 |
| 8,773,088 | B2 | 7/2014 | Menegoli et al. | |
| 8,791,748 | B2 | 7/2014 | Nishida | |
| 9,007,039 | B2* | 4/2015 | Kim | H02M 3/158 |
| | | | | 323/267 |
| 9,287,781 | B2 | 3/2016 | Wilson | |
| 9,529,375 | B2 | 12/2016 | Bayer | |
| 2010/0194359 | A1* | 8/2010 | Notman | H02M 3/1588 |
| | | | | 323/267 |
| 2011/0115777 | A1* | 5/2011 | Park | H02M 3/158 |
| | | | | 345/212 |
| 2012/0062030 | A1* | 3/2012 | Xu | H02M 3/1582 |
| | | | | 307/31 |
| 2016/0079860 | A1* | 3/2016 | Shook | H02M 3/158 |
| | | | | 327/112 |
| 2016/0241142 | A1 | 8/2016 | Scheel | |
| 2017/0025955 | A1 | 1/2017 | Hang et al. | |

* cited by examiner

|  | S11 | S12 | S13 | S14/S15 | Path | VO1/VO2 |
|---|---|---|---|---|---|---|
| Boost Mode | – | – | OFF | ON | PU1 | Increase |
|  | – | – | ON | OFF | PU2 | Decrease |

| | S11 | S12 | S13 | S14/S15 | Path | VO1/VO2 |
|---|---|---|---|---|---|---|
| Buck Mode | OFF | ON | – | ON | PD1 | Increase |
| | ON | OFF | – | OFF | PD2 | Decrease |

|  | S21 | S22 | S23 | S24 | VO1 |
|---|---|---|---|---|---|
| Boost Mode | OFF | OFF | OFF | ON | Increase |
|  | OFF | OFF | ON | OFF | Decrease |
| Buck Mode | OFF | ON | OFF | ON | Increase |
|  | ON | OFF | OFF | OFF | Decrease |

US 10,615,696 B2

ELECTRONIC CIRCUIT PERFORMING BUCK-BOOST CONVERSION USING SINGLE INDUCTIVE ELEMENT

CROSS-REFERENCE TO RELATED APPLICATIONS

This application claims priority under 35 U.S.C. § 119 to Korean Patent Application No. 10-2018-0018223 filed on Feb. 14, 2018, in the Korean Intellectual Property Office, the disclosure of which is incorporated herein by reference in its entirety.

TECHNICAL FIELD

The present disclosure relates to an electronic circuit, and more particularly, relates to a configuration and an operation of an electronic circuit for converting an input voltage to an output voltage by increasing or decreasing a voltage level of the input voltage.

DISCUSSION OF RELATED ART

Nowadays, various types of electronic devices are being used. An electronic device performs its own functions according to operations of electronic circuits included in the electronic device. Each electronic circuit receives a power (e.g., a voltage and a current) from various power sources, and performs intended operations based on the received power.

A voltage conversion circuit such as a voltage regulator or a direct current (DC)-DC converter is an example of various electronic circuits. The voltage conversion circuit receives an input voltage from another entity (e.g., a battery, a wired/wireless power source, a power-related circuit, and/or the like), and generates an output voltage by converting the input voltage. The output voltage is used to operate electronic circuits included in the electronic device.

The voltage conversion circuit may include a passive element (e.g., an inductor, a capacitor, and/or the like) and an active element (e.g., a diode, a transistor, and/or the like) which are connected to convert the input voltage to the output voltage. Meanwhile, each element included in the voltage conversion circuit may consume power. Accordingly, when a power transmission path on the voltage conversion circuit includes many elements, an amount of power consumed by the voltage conversion circuit may increase, and thus efficiency of voltage conversion may be degraded.

The efficiency of voltage conversion may affect various factors (e.g., performance, a characteristic, and/or the like) of the electronic device. In addition, in a portable/mobile electronic device which operates using a battery, the efficiency of voltage conversion may affect an operation time of the electronic device and satisfaction of a user. Accordingly, improving the efficiency of voltage conversion in the voltage conversion circuit is an important issue.

SUMMARY

Example embodiments of the present disclosure may provide an electronic circuit configured to minimize power consumption of a switch element.

In some example embodiments, an electronic circuit may include an inductive element, a capacitive element, and switch elements. A first end of the inductive element may be connected to an input voltage. A first end of a first switch element may be connected to the first end of the inductive element. The capacitive element may be connected between a second end of the first switch element and a second end of the inductive element. A second switch element may be connected between the second end of the first switch element and a reference voltage. A third switch element may be connected between the second end of the inductive element and the reference voltage. A fourth switch element may be connected between the second end of the inductive element and a first output voltage. A fifth switch element may be connected between the second end of the inductive element and a second output voltage.

In some example embodiments, an electronic circuit may include a conversion circuit and a plurality of output circuits. The conversion circuit may output a current through an inductive element based on an input voltage. The plurality of output circuits may respectively output a plurality of output voltages, each of which has a voltage level higher or lower than a voltage level of the input voltage, based on the current. When an output circuit of the plurality of output circuits outputs an output voltage having a voltage level lower than the voltage level of the input voltage, the voltage level of the output voltage may decrease as the current flows along a loop path which includes the inductive element and a capacitive element connected to the conversion circuit, and the voltage level of the output voltage may increase as the current is transferred to the output circuit.

In some example embodiments, an electronic circuit may include a conversion circuit and a switch element. The conversion circuit may output a first current through an inductive element based on an input voltage. The switch element may provide or not provide a current path for the first current and a second current which is based on the first current, to output an output voltage having a voltage level higher or lower than a voltage level of the input voltage. The current path may not include another switch element other than the switch element. When the voltage level of the output voltage is lower than the voltage level of the input voltage and the switch element does not provide the current path, the first current may freewheel through the inductive element.

In some example embodiments, an electronic circuit may include a conversion circuit and switch elements. The conversion circuit may output a current through an inductive element based on an input voltage. A first switch element may selectively provide a first current path for the current, to output a first output voltage having a voltage level higher or lower than a voltage level of the input voltage, based on the current. A second switch element may selectively provide a second current path for the current, to output a second output voltage having a voltage level higher or lower than the voltage level of the input voltage, based on the current. The first and second current paths may include the first and second switch elements respectively, but may not include another switch element other than the first and second switch elements.

In some example embodiments, a direct-current to direct-current (DC-DC) converter includes a voltage-to-current converter circuit, a first current-to-voltage converter circuit, and a control circuit. The voltage-to-current converter circuit receives an input voltage and generates a first current from the input voltage. The first current-to-voltage converter circuit stores a first charge, obtained from the first current, in a first capacitive element and generates a first output voltage from the first charge. And the control circuit controls the voltage-to-current converter circuit and the first current-to-voltage converter circuit to increase the first charge in the first capacitive element during a first period and precludes the voltage-to-current converter circuit and the first current-to-voltage converter circuit from increasing the first charge in the first capacitive element during a second period.

According to example embodiments of the present disclosure, power consumption of a switch element may be minimized in an electronic circuit which performs voltage conversion. Accordingly, the efficiency of voltage conversion may be improved.

BRIEF DESCRIPTION OF THE DRAWINGS

The above and other objects and features of the present disclosure will become apparent from the following descriptions with reference to the accompanying figures.

DETAILED DESCRIPTION OF EXAMPLE EMBODIMENTS

Below, some example embodiments will be described in detail and clearly with reference to the accompanying drawings such that those skilled in the art can easily implement the present disclosure.

Figure 1:
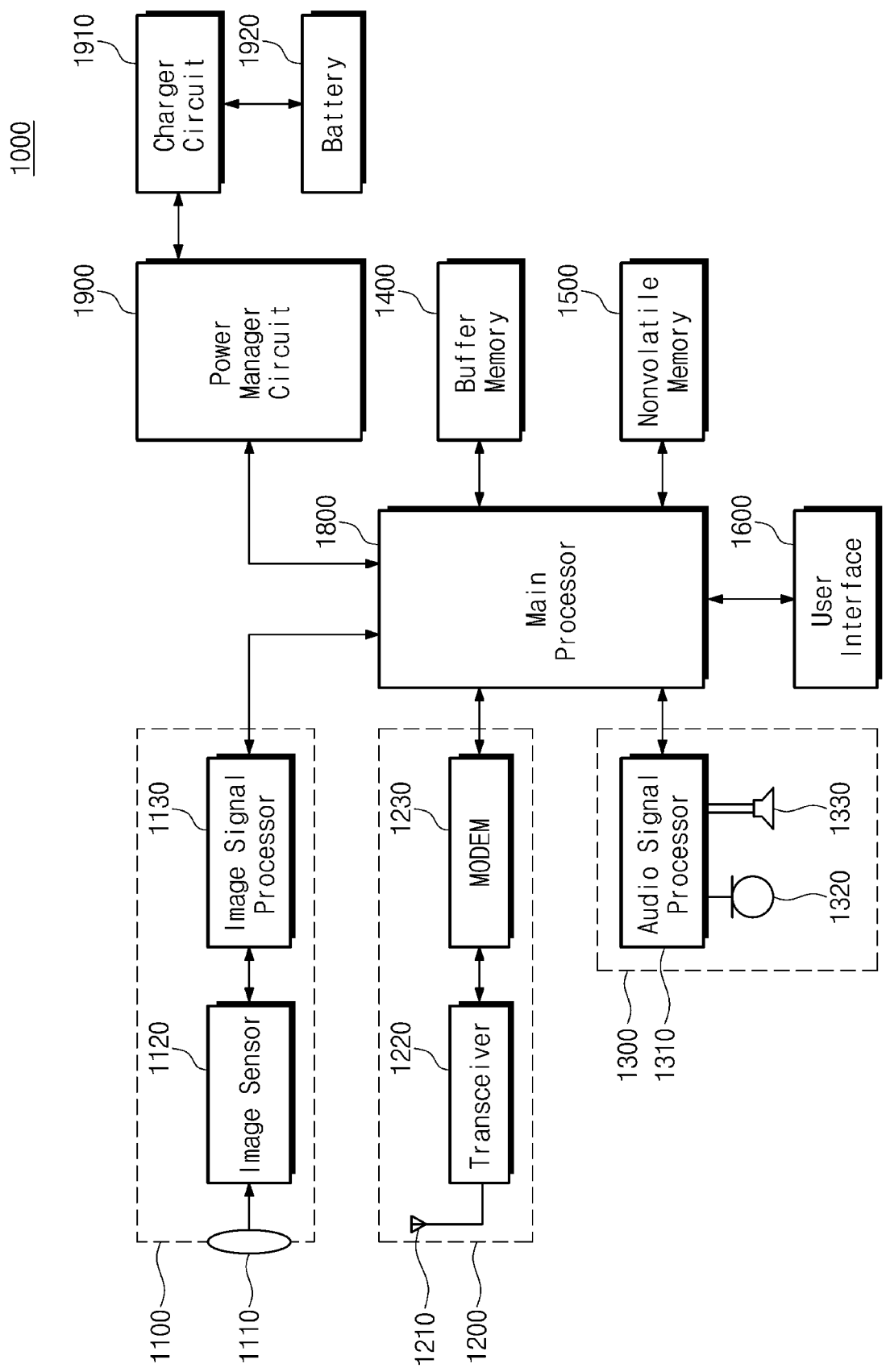
FIG. 1 is a block diagram illustrating an example configuration of an electronic device which may include an electronic circuit according to some example embodiments.

FIG. 1 is a block diagram illustrating an example configuration of an electronic device 1000 which may include an electronic circuit according to some example embodiments. For example, the electronic device 1000 may be implemented with one of various types of electronic devices such as a desktop computer, a tablet computer, a laptop computer, a smart phone, a wearable device, a workstation, a server, an electric vehicle, home appliance, medical appliance, and/or the like.

The electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a main processor 1800, a power manager circuit 1900, and a charger circuit 1910.

For example, the electronic device 1000 may be connected to a battery 1920, and the battery 1920 may supply power used in an operation of the electronic device 1000. However, the present disclosure is not limited thereto. For example, the power supplied to the electronic device 1000 may come from a power source other than the battery 1920.

The image processing block 1100 may receive light through a lens 1110. An image sensor 1120 and an image signal processor 1130 included in the image processing block 1100 may generate image information associated with an external subject, based on the received light.

The communication block 1200 may exchange signals with an external device/system through an antenna 1210. A transceiver 1220 and a MODEM (modulator/demodulator) 1230 of the communication block 1200 may process signals exchanged with the external device/system, in compliance with one or more of various wired/wireless communication protocols.

The audio processing block 1300 may process sound information by using an audio signal processor 1310. The audio processing block 1300 may receive an audio input through a microphone 1320, and may output audio through a speaker 1330.

The buffer memory 1400 may store data used in an operation of the electronic device 1000. For example, the buffer memory 1400 may temporarily store data processed or to be processed by the main processor 1800. For example, the buffer memory 1400 may include a volatile memory such as a static random access memory (SRAM), a dynamic RAM (DRAM), and/or a synchronous DRAM (SDRAM), and/or a nonvolatile memory such as a phase-change RAM (PRAM), a magneto-resistive RAM (MRAM), a resistive RAM (ReRAM), and/or a ferroelectric RAM (FRAM).

The nonvolatile memory 1500 may store data regardless of power being supplied. For example, the nonvolatile memory 1500 may include at least one of various nonvolatile memories such as a flash memory, a PRAM, an MRAM, a ReRAM, and/or a FRAM. For example, the nonvolatile memory 1500 may include a removable memory such as a secure digital (SD) card or a solid state drive (SSD), and/or an embedded memory such as an embedded multimedia card (eMMC).

The user interface 1600 may arbitrate communication between a user and the electronic device 1000. For example, the user interface 1600 may include an input interface for receiving an input from a user and an output interface for providing information to the user.

The main processor 1800 may control overall operations of components of the electronic device 1000. The main processor 1800 may process various operations to operate the electronic device 1000. For example, the main processor 1800 may be implemented with an operation processing device/circuit which includes one or more processor cores, such as a general-purpose processor, a special-purpose processor, an application processor, and/or a microprocessor.

The power manager circuit 1900 and the charger circuit 1910 may supply the power which is used in operating the electronic device 1000. This will be described with reference to FIG. 2.

Figure 2:
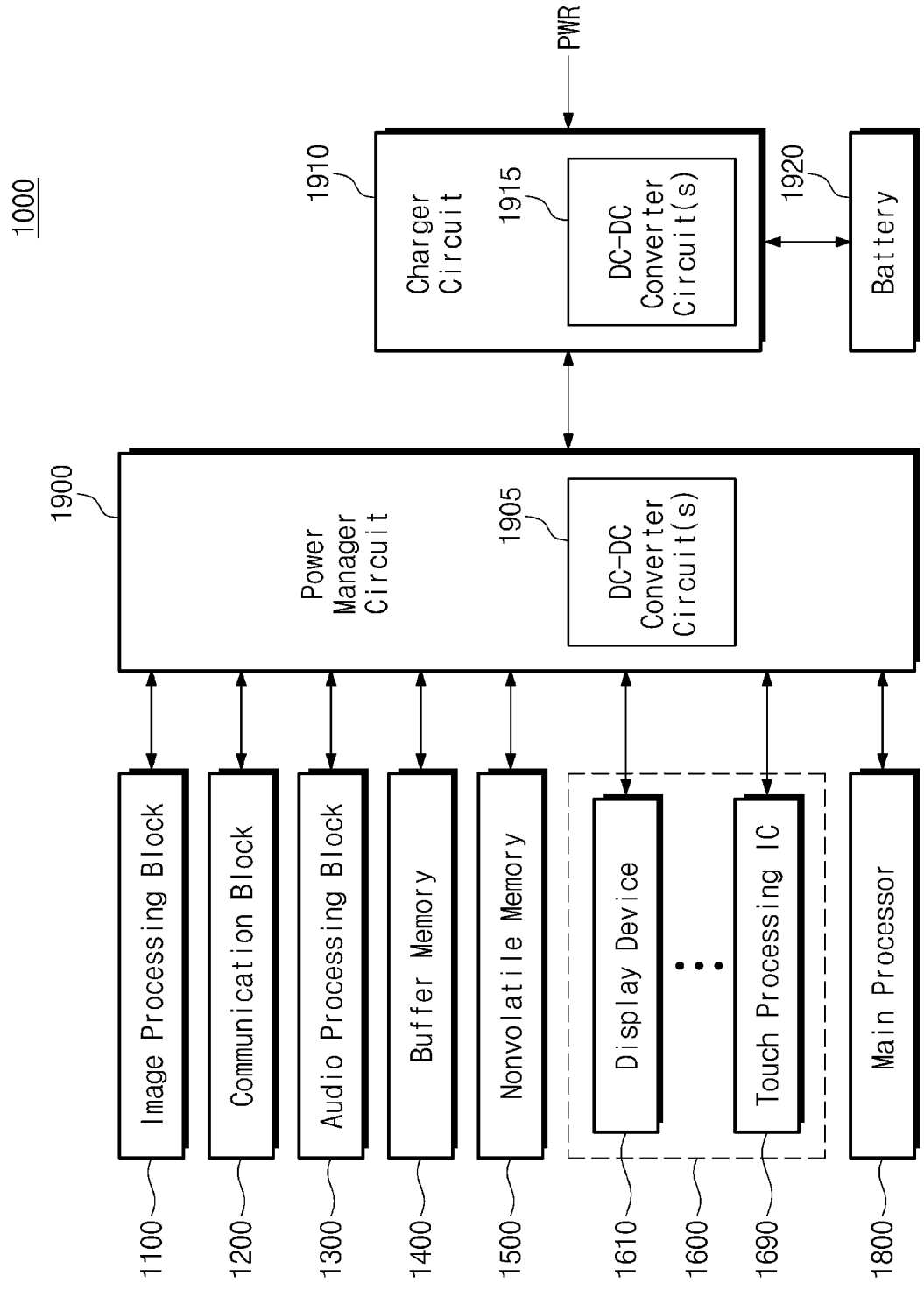
FIG. 2 is a block diagram illustrating an example configuration associated with transferring power to components in an electronic device of FIG. 1.

FIG. 2 is a block diagram illustrating an example configuration associated with transferring power to components in the electronic device 1000 of FIG. 1.

The power manager circuit 1900 may supply the power to components of the electronic device 1000. For example, the charger circuit 1910 may output a system voltage based on power PWR received from the battery 1920 and/or another external power source. The power manager circuit 1900 may output the power to be supplied to the components of the electronic device 1000, based on the system voltage. The power manager circuit 1900 may transfer the power obtained by suitably converting the system voltage, to the components of the electronic device 1000.

To this end, for example, the power manager circuit 1900 may include one or more DC-DC conversion circuits 1905, and the charger circuit 1910 may include one or more DC-DC conversion circuits 1915. Each of the DC-DC conversion circuits 1905 and 1915 may be configured to convert an input DC voltage to generate an output DC voltage. The output voltage may be converted from the input voltage such that a voltage level of the output voltage is higher or lower than a voltage level of the input voltage.

For example, the DC-DC conversion circuit 1915 may convert a voltage of the battery 1920 and/or an external power source to output a voltage required by the power manager circuit 1900. The DC-DC conversion circuit 1915 may convert a voltage of the external power source to output a voltage required by the battery 1920. The DC-DC conversion circuit 1905 may convert a voltage output from the charger circuit 1910 to output a voltage to be transferred to the components of the electronic device 1000.

For example, the voltage output from the DC-DC conversion circuit 1905 may be transferred to at least one of the image processing block 1100, the communication block 1200, the audio processing block 1300, the buffer memory 1400, the nonvolatile memory 1500, the user interface 1600 (e.g., input/output interfaces such as a display device 1610 and a touch processing integrated circuit (IC) 1690), and/or the main processor 1800. The components of the electronic device 1000 may operate based on the transferred voltage.

Meanwhile, voltage levels of voltages required by the components of the electronic device 1000 may be different from one another. In some example embodiments, the power manager circuit 1900 may include a plurality of DC-DC conversion circuits 1905 to output a plurality of voltages having different voltage levels.

Alternatively, in some example embodiments, the power manager circuit 1900 may include one DC-DC conversion circuit 1905. In such example embodiments, the one DC-DC conversion circuit 1905 may convert one input voltage to a plurality of output voltages to supply a plurality of voltages to a plurality of components of the electronic device 1000. This will be further described with reference to FIG. 3.

The components illustrated in FIGS. 1 and 2 are provided to facilitate better understanding, and are not intended to limit the present disclosure. The electronic device 1000 may not include one or more of the components illustrated in FIGS. 1 and 2, and additionally or alternatively, may further include at least one component not illustrated in FIGS. 1 and 2.

In the present disclosure, example configurations associated with the DC-DC conversion circuit 1905 will be described. However, example embodiments may be employed for the DC-DC conversion circuit 1915 or other components of the electronic device 1000 to convert an input voltage to an output voltage. It may be readily understood that the present disclosure is not limited to be associated with the DC-DC conversion circuit 1905.

Figure 3:
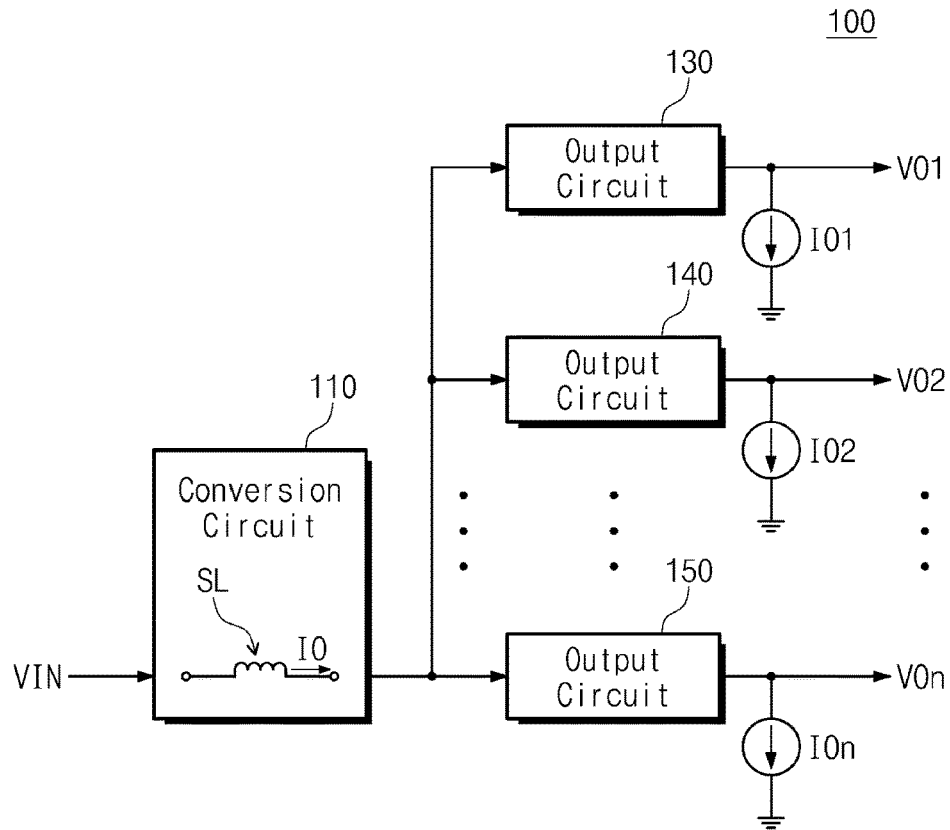
FIG. 3 is a block diagram illustrating an example configuration of an electronic circuit included in a DC-DC conversion circuit of FIG. 2.

FIG. 3 is a block diagram illustrating an example configuration of an electronic circuit 100 included in the DC-DC conversion circuit 1905 of FIG. 2.

The electronic circuit 100 may convert one input voltage VIN to a plurality of output voltages VO1, VO2, and VOn. For example, the input voltage VIN may be provided from another electronic circuit such as the charger circuit 1910, the battery 1920, and/or the like. The output voltages VO1, VO2, and VOn may be transferred to components of the electronic device 1000.

The electronic circuit 100 may include a conversion circuit 110 and a plurality of output circuits 130, 140, and 150. The conversion circuit 110 may receive the input voltage VIN. The conversion circuit 110 may output a current I0 through an inductive element SL, based on the input voltage VIN.

As will be described later, the inductive element SL may be employed to convert the input voltage VIN to the output voltages VO1, VO2, and VOn. The inductive element SL may be included inside the electronic circuit 100. Alternatively, the inductive element SL may be a discrete element which is disposed outside a chip or a package including the electronic circuit 100 and is connected to the electronic circuit 100 through a pad or pin.

The output circuits 130, 140, and 150 may respectively output the output voltages VO1, VO2, and VOn based on the current I0. As the output voltages VO1, VO2, and VOn are provided, currents IO1, IO2, and IOn may flow to output terminals of the output circuits 130, 140, and 150. The output voltages VO1, VO2, and VOn and the currents IO1, IO2, and IOn may be output as the power used to operate the components of the electronic device 1000.

A voltage level of each of the output voltages VO1, VO2, and VOn may be higher or lower than a voltage level of the input voltage VIN. For example, when the output voltage VO1 is converted from the input voltage VIN such that the voltage level of the output voltage VO1 is lower than the voltage level of the input voltage VIN, the conversion circuit 110 and the output circuit 130 may be understood as performing a function of a buck converter or a step-down converter. On the other hand, when the output voltage VO1 is converted from the input voltage VIN such that the voltage level of the output voltage VO1 is higher than the voltage level of the input voltage VIN, the conversion circuit 110 and the output circuit 130 may be understood as performing a function of a boost converter or a step-up converter.

The output circuits 130, 140, and 150 may output the output voltages VO1, VO2, and VOn independently of one another. For example, the output circuit 130 may output the output voltage VO1 of a voltage level which depends on a requirement of a component operating based on the output voltage VO1, and the voltage level of the output voltage VO1 may be higher or lower than the voltage level of the input voltage VIN depending on the requirement of the component. For example, the output circuit 140 may output the output voltage VO2 of a voltage level higher or lower than the voltage level of the input voltage VIN, regardless of whether the voltage level of the output voltage VO1 is higher or lower than the voltage level of the input voltage VIN. Accordingly, the electronic circuit 100 may perform a function of a buck-boost converter.

The electronic circuit 100 may employ a single inductive element SL, instead of employing a plurality of inductive elements, to output the plurality of output voltages VO1, VO2, and VOn. A configuration of the electronic circuit 100 may be understood as a single-inductor-multiple-output (SIMO) buck-boost converter. As only the single inductive element SL is employed to output the plurality of output voltages VO1, VO2, and VOn, a circuit area required by the electronic circuit 100 may decrease. In addition, electromagnetic interference (EMI) between plural inductive elements may be prevented.

FIG. 3 illustrates three output voltages VO1, VO2, and VOn, but the present disclosure is not limited thereto. The number of output voltages which the electronic circuit 100 provides may be variously changed or modified. To facilitate better understanding, examples associated with two output voltages VO1 and VO2 will be described with reference to FIGS. 4 to 15. Such a configuration may be understood as a single-inductor-dual-output (SIDO) buck-boost converter.

Figure 4:
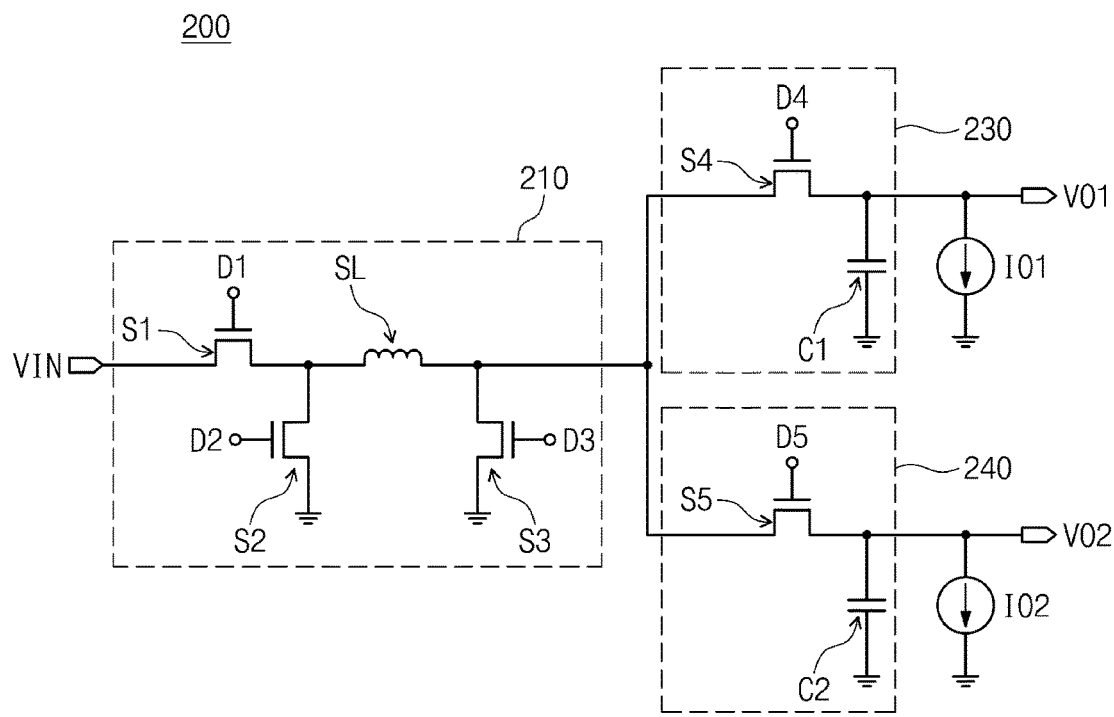
FIG. 4 is a conceptual diagram illustrating a related-art configuration associated with an electronic circuit of FIG. 3.

FIG. 4 is a conceptual diagram illustrating a related-art configuration associated with the electronic circuit 100 of FIG. 3. In some cases, the electronic circuit 100 of FIG. 3 may be implemented with an electronic circuit 200 of FIG. 4.

The electronic circuit 200 may include a conversion circuit 210 and output circuits 230 and 240. The conversion circuit 210 and the output circuits 230 and 240 may correspond to the conversion circuit 110 and the output circuits 130, 140, and 150 of FIG. 3.

The conversion circuit 210 may include switch elements S1, S2, and S3. The inductive element SL may be included in the conversion circuit 210, or may be a discrete element which is disposed outside the electronic circuit 200 and is connected to the electronic circuit 200. The output circuit 230 may include a switch element S4 and a capacitive element C1, and the output circuit 240 may include a switch element S5 and a capacitive element C2.

The switch elements S1 to S5 may be connected (or turned on) or disconnected (or turned off) in response to control signals D1 to D5 respectively. In the present disclosure, the connection or turn-on of a switch element may mean a state where a current flows through the switch element. On the other hand, the disconnection or turn-off of a switch element may mean a state where passing a current through the switch element is blocked.

According to an operation of the switch element S1, the inductive element SL may receive the input voltage VIN. According to operations of the switch elements S2 and S3, energy may be stored in the inductive element SL or the energy stored in the inductive element SL may be transferred to another element, and a voltage-second balance may be maintained at both ends of the inductive element SL.

According to an operation of the switch element S4, a current path may be provided between the input voltage VIN and the output voltage VO1. According to an operation of the switch element S5, a current path may be provided between the input voltage VIN and the output voltage VO2. The capacitive elements C1 and C2 may buffer the output voltages VO1 and VO2 respectively.

Figure 5:
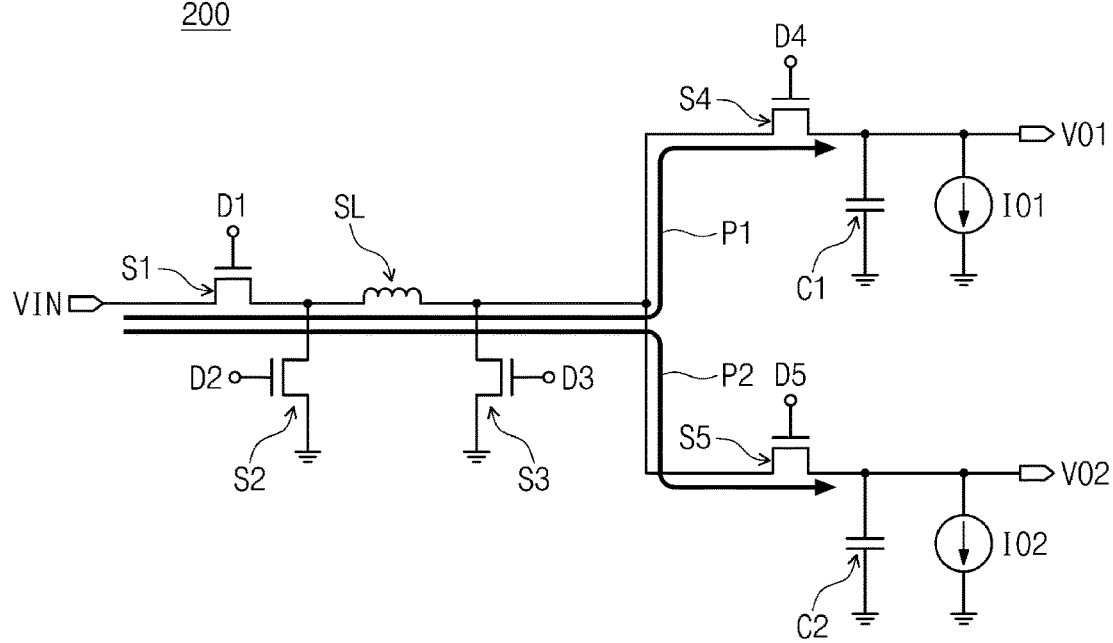
FIG. 5 is a conceptual diagram for describing a related-art operation of an electronic circuit of FIG. 4.

FIG. 5 is a conceptual diagram for describing a related-art operation of the electronic circuit 200 of FIG. 4.

When the switch elements S1 and S4 are connected, a current path P1 may be provided between the input voltage VIN and the output voltage VO1. According to the connection of the switch element S4, the input voltage VIN may be converted to the output voltage VO1, and the electronic circuit 200 may output the output voltage VO1.

When the switch elements S1 and S5 are connected, a current path P2 may be provided between the input voltage VIN and the output voltage VO2. According to the connection of the switch element S5, the input voltage VIN may be converted to the output voltage VO2, and the electronic circuit 200 may output the output voltage VO2.

When the current path P1 is provided, a current may flow through two switch elements S1 and S4. When the current path P2 is provided, a current may flow through two switch elements S1 and S5. According to the configuration of the electronic circuit 200, a current flowing from an input terminal to an output terminal may pass two switch elements.

Each of the switch elements S1 to S5 may consume power. For example, as a current flows along the current path P1, conduction loss or switching loss may occur at the switch elements S1 and S4. For example, as a current flows along the current path P2, conduction loss or switching loss may occur at the switch elements S1 and S5.

According to the configuration of the electronic circuit 200, as a current flows from an input terminal to an output terminal, power may be lost at two switch elements. When an amount of power lost at switch elements increases, efficiency of voltage conversion or power transfer may be degraded.

Figure 6:
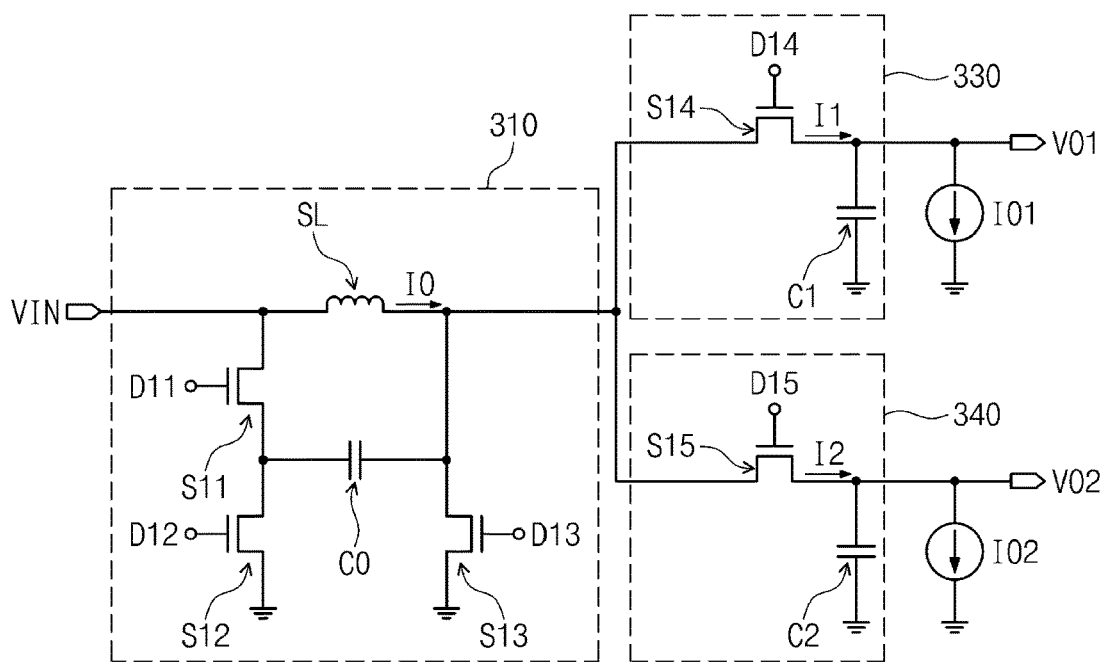
FIG. 6 is a conceptual diagram illustrating an example configuration implemented with an electronic circuit of FIG. 3 according to some example embodiments.

FIG. 6 is a conceptual diagram illustrating an example configuration implemented with the electronic circuit 100 of FIG. 3 according to some example embodiments. In some example embodiments, the electronic circuit 100 of FIG. 3 may be implemented with an electronic circuit 300 of FIG. 6.

The electronic circuit 300 may include a conversion circuit 310 and output circuits 330 and 340. The conversion circuit 310 and the output circuits 330 and 340 may correspond to the conversion circuit 110 and the output circuits 130, 140, and 150 of FIG. 3.

The conversion circuit 310 may include switch elements S11, S12, and S13. Each of the inductive element SL and a capacitive element C0 may be included in the conversion circuit 310, or may be a discrete element which is disposed outside a chip or package including the electronic circuit 300 and is connected to the electronic circuit 300 through a pad or pin. The output circuit 330 may include a switch element S14 and the capacitive element C1, and the output circuit 340 may include a switch element S15 and the capacitive element C2.

The switch elements S11 to S15 may be connected (or turned on) or disconnected (or turned off) in response to control signals D11 to D15 respectively. FIG. 6 illustrates that each of the switch elements S11 to S15 is a transistor, but the present disclosure is not limited thereto. Each of the switch elements S11 to S15 may be implemented with any element which is able to provide a switch function to pass or block a current.

A first end of the inductive element SL may be connected to the input voltage VIN. The inductive element SL may output the current IO0 based on the input voltage VIN. Accordingly, the conversion circuit 310 may output the current I0 through the inductive element SL, based on the input voltage VIN.

A first end of the switch element S11 may be connected to the first end of the inductive element SL. The capacitive element C0 may be connected between a second end of the switch element S11 and a second end of the inductive element SL. A first end of the capacitive element C0 may be connected to the second end of the switch element S11, and a second end of the capacitive element C0 may be connected to the second end of the inductive element SL. The switch element S11 may be connected between the first end of the inductive element SL and the first end of the capacitive element C0.

The switch element S12 may be connected between the second end of the switch element S11 (or the first end of the capacitive element C0) and a reference voltage. The switch element S13 may be connected between the second end of the inductive element SL (or the second end of the capacitive element C0) and the reference voltage. For example, the reference voltage may be a ground voltage, but the present disclosure is not limited thereto.

The switch element S14 may be connected between the second end of the inductive element SL and the output voltage VO1. A first end of the switch element S14 may be connected to the second end of the inductive element SL. The capacitive element C1 may be connected between a second end of the switch element S14 and the reference voltage. The capacitive element C1 may buffer the output voltage VO1.

When the switch element S14 is connected, the switch element S14 may provide a current path for the current I0 and a current I1 which is based on the current I0, and the current I1 may flow through the switch element S14. When the switch element S14 is disconnected, the switch element S14 may not provide the current path. The switch element S14 may selectively provide the current path in response to the control signal D14.

The switch element S15 may be connected between the second end of the inductive element SL and the output voltage VO2. A first end of the switch element S15 may be connected to the second end of the inductive element SL. The capacitive element C2 may be connected between a second end of the switch element S15 and the reference voltage. The capacitive element C2 may buffer the output voltage VO2.

When the switch element S15 is connected, the switch element S15 may provide a current path for the current I0 and a current I2 which is based on the current I0, and the current I2 may flow through the switch element S15. When the switch element S15 is disconnected, the switch element S15 may not provide the current path. The switch element S15 may selectively provide the current path in response to the control signal D15.

The output circuit 330 may output the output voltage VO1, based on the current I0 and the current I1, according to an operation of the switch element S14. The output circuit 340 may output the output voltage VO2, based on the current I0 and the current I2, according to an operation of the switch element S15. Accordingly, according to an operation of the electronic circuit 300, the output voltages VO1 and VO2 may be converted from the input voltage VIN. Each of voltage levels of the output voltages VO1 and VO2 may be higher or lower than a voltage level of the input voltage VIN.

Figure 7:
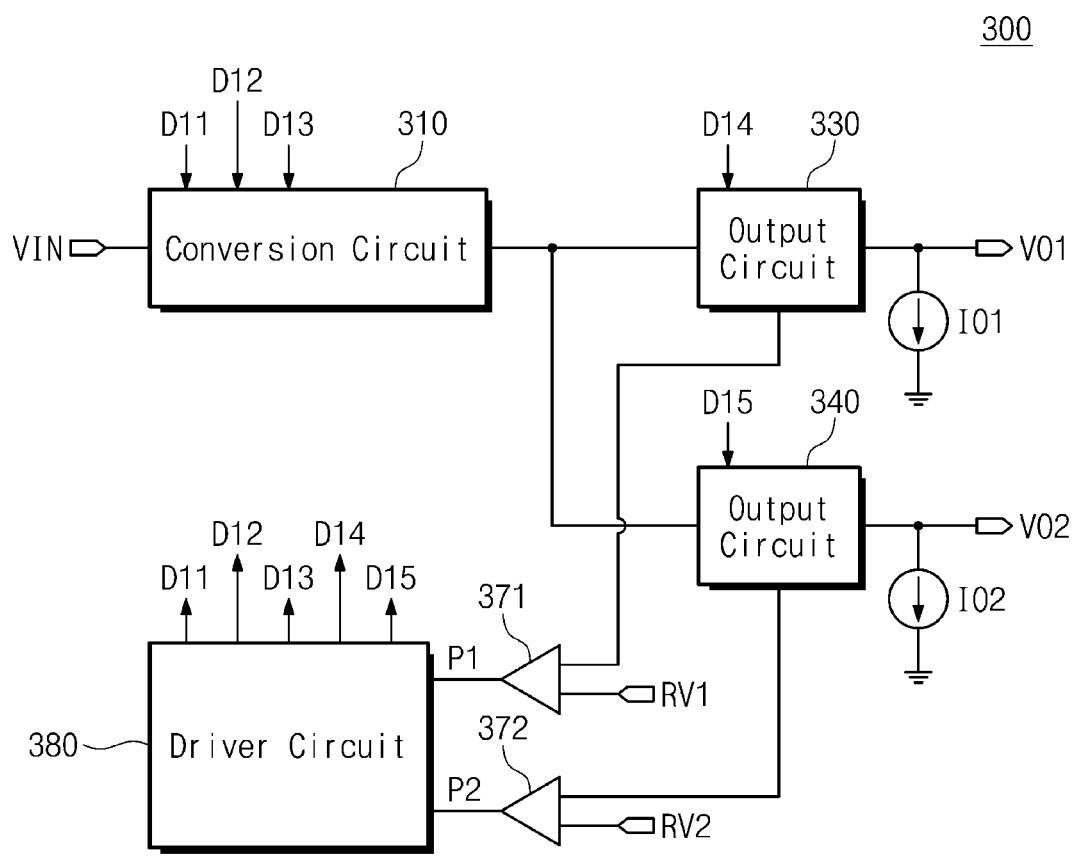
FIG. 7 is a block diagram illustrating an example configuration associated with an electronic circuit of FIG. 6.

FIG. 7 is a block diagram illustrating an example configuration associated with the electronic circuit 300 of FIG. 6.

In some example embodiments, the electronic circuit 300 may further include comparators 371 and 372 and a driver circuit 380. The comparators 371 and 372 and the driver circuit 380 may be configured to provide the control signals D11 to D15 to the switch elements S11 to S15 of the conversion circuit 310 and the output circuits 330 and 340.

The comparator 371 may compare an intensity of the current I1 flowing in the output circuit 330 with a reference value RV1, and the comparator 372 may compare an intensity of the current I2 flowing in the output circuit 340 with a reference value RV2. The comparators 371 and 372 may output comparison results P1 and P2 respectively. In some cases, the electronic circuit 300 may further include a sensor circuit for sensing the intensity of the current I1 and the intensity of the current I2. The driver circuit 380 may generate the control signals D11 to D15 based on the comparison results P1 and P2.

For example, when the comparison result P1 indicates that the intensity of the current I1 is higher than an intended intensity (e.g., the reference value RV1), the driver circuit 380 may generate the control signals D11 to D14 to control the switch elements S11 to S14 such that the intensity of the current I1 and the voltage level of the output voltage VO1 decrease. On the other hand, when the comparison result P1 indicates that the intensity of the current I1 is lower than an intended intensity, the driver circuit 380 may generate the control signals D11 to D14 to control the switch elements S11 to S14 such that the intensity of the current I1 and the voltage level of the output voltage VO1 increase.

In such a manner, the voltage level of the output voltage VO1 may be regulated to have an intended voltage level (e.g., a voltage level required by a component of the electronic device 1000). The voltage level of the output voltage VO2 may also be regulated in a similar manner. The reference values RV1 and RV2 may be selected depending on intended voltage levels of the output voltages VO1 and VO2.

Figure 8:
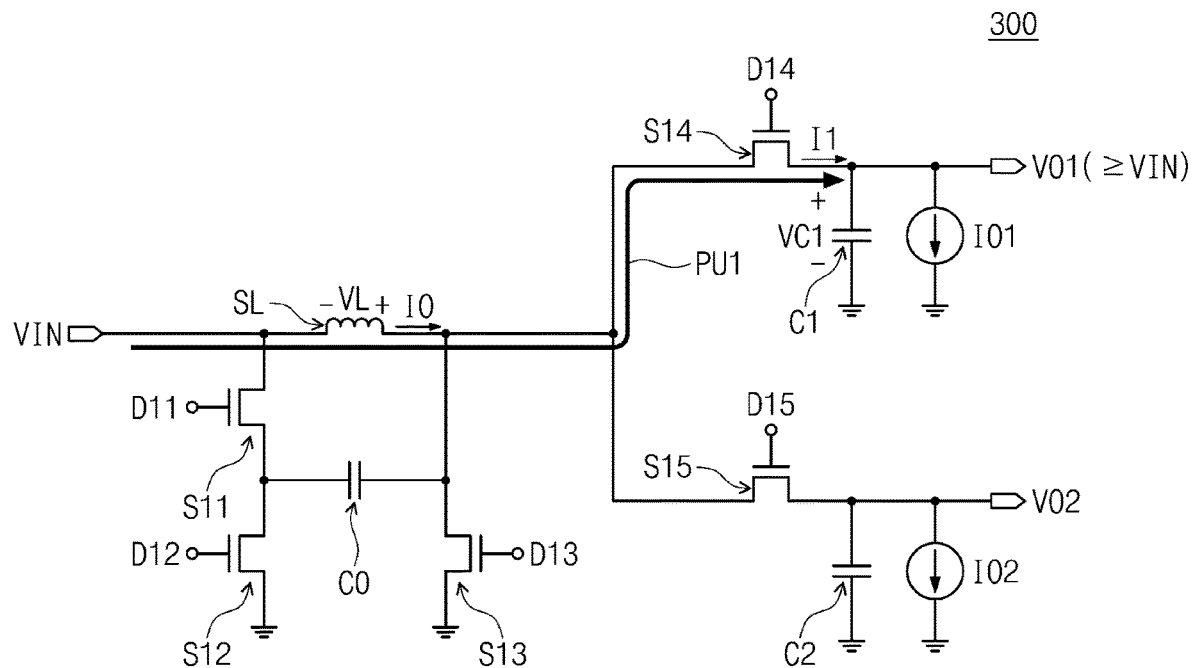
FIGS. 8 and 9 are conceptual diagrams for describing example operations of an electronic circuit of FIG. 6.
Figure 9:
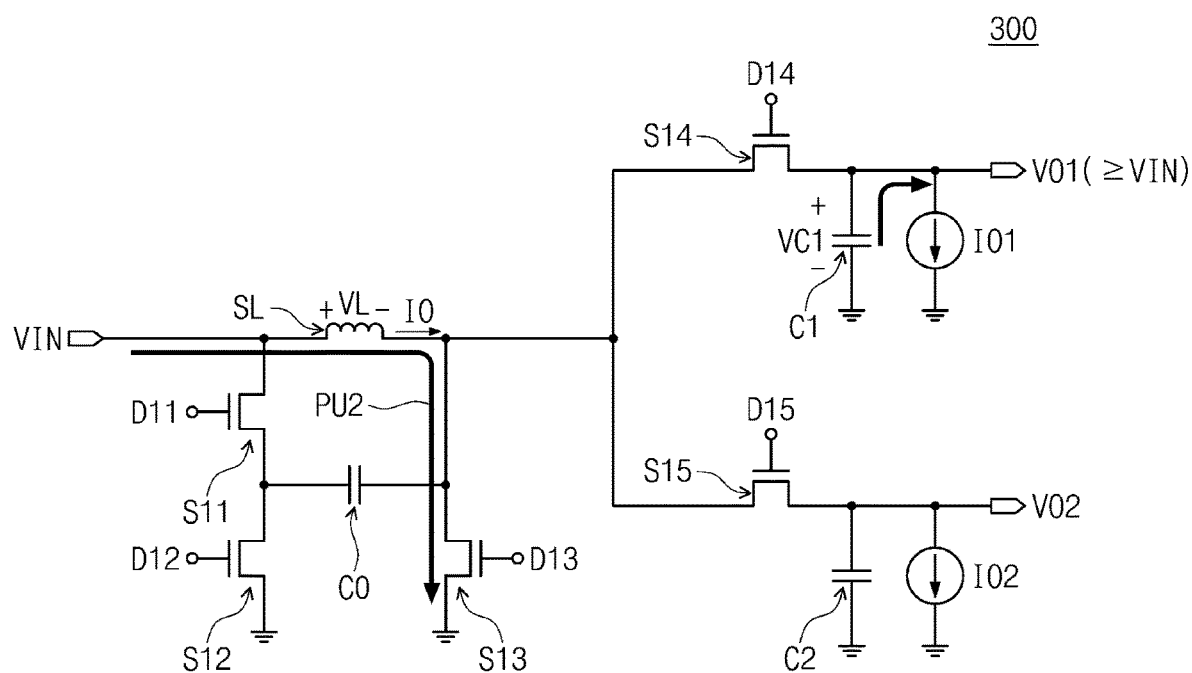

FIGS. 8 and 9 are conceptual diagrams for describing example operations of the electronic circuit 300 of FIG. 6. For example, FIGS. 8 and 9 may be associated with a case where the voltage level of the output voltage VO1 is higher than the voltage level of the input voltage VIN (e.g., a case where the electronic circuit 300 performs a function of a boost converter with regard to the output voltage VO1).

FIG. 8 illustrates a first state of boost conversion. In the first state of the boost conversion, a current path PU1 may be provided. Along the current path PU1, the current I0 may flow through the inductive element SL based on the input voltage VIN.

For example, the switch element S14 may be connected. Along the current path PU1, the current I1 may flow through the switch element S14 based on the current IO0. Accordingly, the input voltage VIN may be converted to the output voltage VO1 based on the current IO0 and the current I1. When the current IO0 and the current I1 flow through the inductive element SL and the switch element S14, the flow of the current IO0 and the current I1 may not pass through another switch element other than the switch element S14.

As the current IO0 and the current I1 flow along the current path PU1, a voltage VL may be applied between both ends of the inductive element SL. In addition, the capacitive element C1 may store charges, and a voltage VC1 may be applied between both ends of the capacitive element C1. As the voltage VL is applied, the voltage VC1 may have a voltage level higher than the voltage level of the input voltage VIN.

The voltage VC1 may be output as the output voltage VO1. Accordingly, the output voltage VO1 may be converted from the input voltage VIN such that the voltage level of the output voltage VO1 is higher than the voltage level of the input voltage VIN. It may be understood that energy stored in the inductive element SL is transferred to the output circuit 330 in the first state of the boost conversion.

FIG. 9 illustrates a second state of the boost conversion. In the second state of the boost conversion, a current path PU2 may be provided. Along the current path PU2, the current I0 may flow through the inductive element SL based on the input voltage VIN. For example, the switch element S13 may be connected. Accordingly, along the current path PU2, the current I0 may flow to a reference voltage terminal through the switch element S13.

As the current I0 flows along the current path PU2, the voltage VL may be applied between both ends of the inductive element SL. It may be understood that energy is stored in the inductive element SL based on the current I0 in the second state of the boost conversion. The energy stored in the inductive element SL may be transferred to the output circuit 330 in the first state of the boost conversion.

The voltage VC1 between both ends of the capacitive element C1 may be provided as a source of the output voltage VO1 and the current IO1. The charges stored in the capacitive element C1 in the first state of the boost conversion may be used to output the output voltage VO1.

When the boost conversion is required with regard to the output voltage VO1, the second state of FIG. 9 may be first provided. In the second state of the boost conversion, the energy may be stored (i.e., built up) in the inductive element SL. Afterwards, the first state of FIG. 8 may be provided. In the first state of the boost conversion, the energy of the inductive element SL may be transferred to an output terminal (e.g., the capacitive element C1). As will be described with reference to FIG. 11, the second state and the first state may be alternately repeated, and thus the output voltage VO1 may be output to have a voltage level higher than the voltage level of the input voltage VIN.

Figures 10, 11:
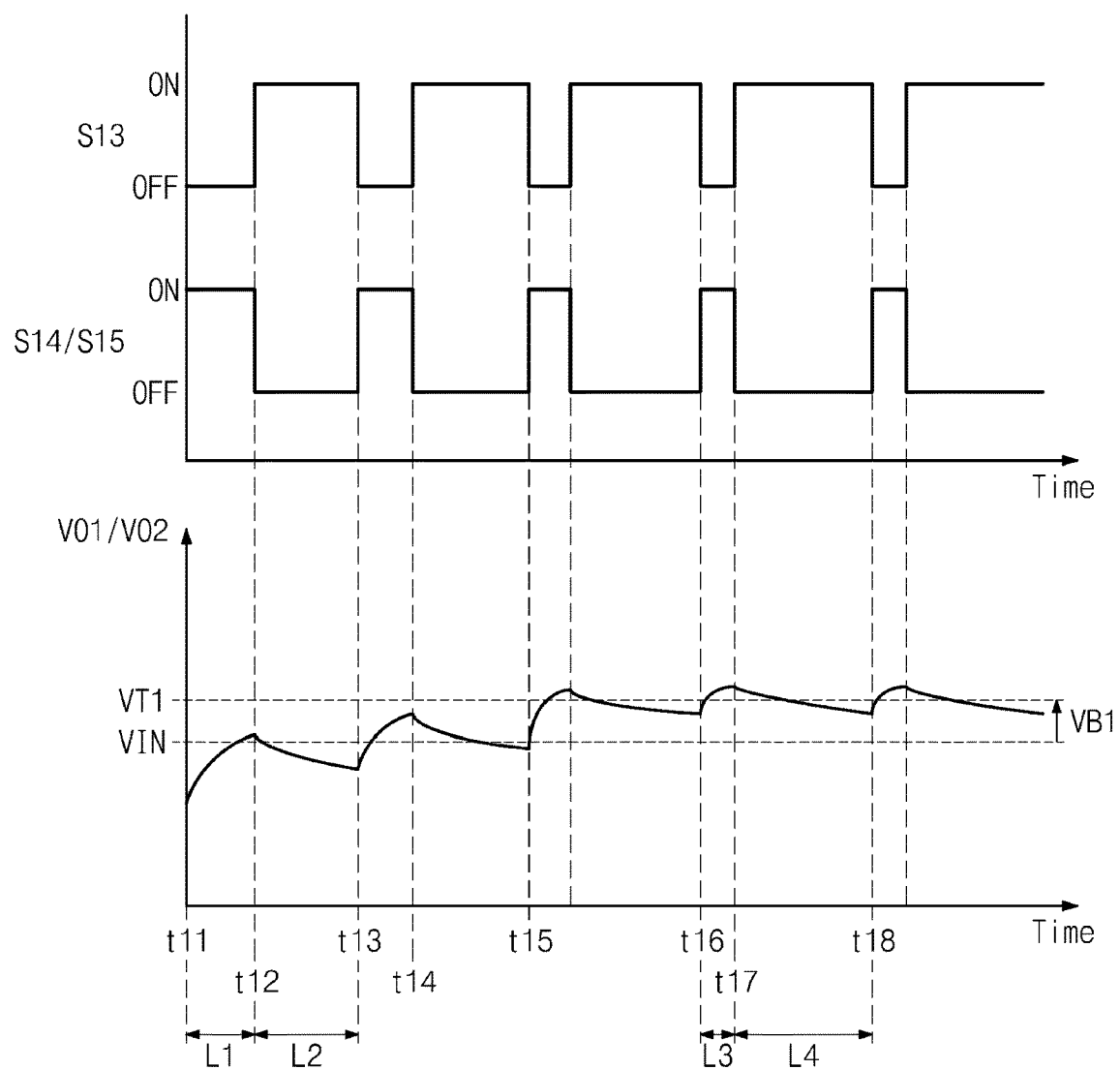
FIG. 10 is a table describing example operations of FIGS. 8 and 9.
FIG. 11 is a timing diagram for describing example operations of FIGS. 8 and 9.

FIG. 10 is a table describing the example operations of FIGS. 8 and 9.

In the first state of the boost conversion, the current path PU1 may be provided (Refer to FIG. 8). To this end, the switch element S13 may be disconnected or turned off, and the switch element S14 may be connected or turned on. In the second state of the boost conversion, the current path PU2 may be provided (Refer to FIG. 9). To this end, the switch element S13 may be connected or turned on, and the switch element S14 may be disconnected or turned off.

FIGS. 8 and 9 have been referenced to describe the boost conversion associated with the output voltage VO1. However, the electronic circuit 300 may also perform a function of boost conversion associated with the output voltage VO2. For example, when the switch element S13 is disconnected and the switch element S15 is connected, a current path from the input voltage VIN to the output voltage VO2 may be provided similar to the current path PU1. For example, when the switch element S13 is connected and the switch element S15 is disconnected, the current path PU2 may be provided.

In the boost conversion, while the current path PU1 is provided, the voltage level of the output voltage VO1 or VO2 may increase. On the other hand, while the current path PU2 is provided, the voltage level of the output voltage VO1 or VO2 may decrease. This will be further described with reference to FIG. 11.

Operations of the switch elements S11 and S12 may be variously changed or modified to provide the current paths PU1 and PU2. For example, while the electronic circuit 300 performs the boost conversion associated with the output voltage VO1, the operations of the switch elements S11 and S12 may be suitably controlled depending on a type of voltage conversion associated with the output voltage VO2.

FIG. 11 is a timing diagram for describing the example operations of FIGS. 8 and 9.

Although not illustrated in FIG. 11, first, before time t11, the switch element S13 may be connected, and the switch element S14 or S15 may be disconnected. In this case, energy may be stored in the inductive element SL.

For example, between time t11 and t12, the switch element S13 may be disconnected, and the switch element S14 or S15 may be connected. In this case, the energy stored in the inductive element SL may be transferred to the output circuit 330 or 340. Accordingly, a voltage level of the output voltage VO1 or VO2 may increase (the first state of the boost conversion).

For example, between time t12 and t13, the switch element S13 may be connected, and the switch element S14 or S15 may be disconnected. In this case, charges stored in the capacitive element C1 or C2 may be used to output the output voltage VO1 or VO2. As the capacitive element C1 or C2 is discharged, the voltage level of the output voltage VO1 or VO2 may decrease (the second state of the boost conversion). Meanwhile, energy may be stored in the inductive element SL.

In such a manner, the voltage level of the output voltage VO or VO2 may repeat an increase and a decrease alternately. For example, the voltage level of the output voltage VO1 or VO2 may increase between time t13 and t14, and the voltage level of the output voltage VO1 or VO2 may decrease between time t14 and t15.

As the voltage level of the output voltage VO1 or VO2 varies, the voltage level of the output voltage VO1 or VO2 may reach near an intended voltage level VT1 (e.g., at time t16). The intended voltage level VT1 may be a voltage level required by a component of the electronic device 1000, and may be higher by an increment VB1 than the voltage level of the input voltage VIN.

As the voltage level of the output voltage VO1 or VO2 repeats an increase and a decrease continuously, the voltage level of the output voltage VO1 or VO2 may be maintained near the intended voltage level VT1. For example, the voltage level of the output voltage VO1 or VO2 may increase between time t16 and t17, and the voltage level of the output voltage VO1 or VO2 may decrease between time t17 and t18. However, the voltage level of the output voltage VO1 or VO2 may not be greatly out of the intended voltage level VT1.

As the first state of the boost conversion and the second state of the boost conversion are alternately repeated, the voltage level of the output voltage VO1 or VO2 may be maintained near the intended voltage level VT1. In addition, the voltage-second balance may be maintained at both ends of the inductive element SL.

A ratio of a length of a time period where the voltage level of the output voltage VO1 or VO2 increases to a length of a time period where the voltage level of the output voltage VO1 or VO2 decreases may be associated with a variation tendency of the voltage level of the output voltage VO1 or VO2. As the length of the time period where the voltage level of the output voltage VO1 or VO2 increases becomes longer, the voltage level of the output voltage VO1 or VO2 may have an increasing tendency. On the other hand, as the length of the time period where the voltage level of the output voltage VO1 or VO2 decreases becomes shorter, the voltage level of the output voltage VO1 or VO2 may have a decreasing tendency.

Accordingly, a direction where the voltage level of the output voltage VO1 or VO2 varies may be controlled by adjusting the ratio of the length of the time period where the voltage level of the output voltage VO1 or VO2 increases to the length of the time period where the voltage level of the output voltage VO1 or VO2 decreases. The driver circuit 380 may output the control signals D11 to D15 such that the voltage level of the output voltage VO1 or VO2 varies in an intended direction.

For example, a ratio of a time length L1 to a time length L2 may be greater than a ratio of a time length L3 to a time length L4. Between time t11 and t13, the voltage level of the output voltage VO1 or VO2 may have an increasing tendency. Between time t16 and t18, the voltage level of the output voltage VO1 or VO2 may have a maintaining tendency.

Figure 12:
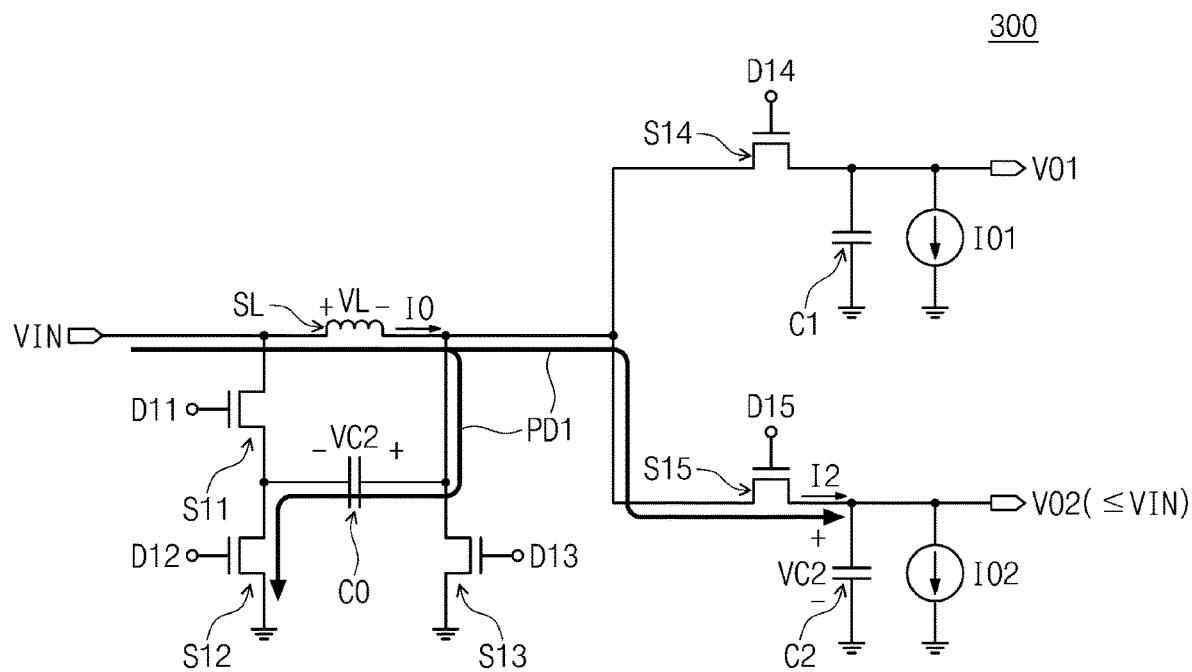
FIGS. 12 and 13 are conceptual diagrams for describing example operations of an electronic circuit of FIG. 6.
Figure 13:
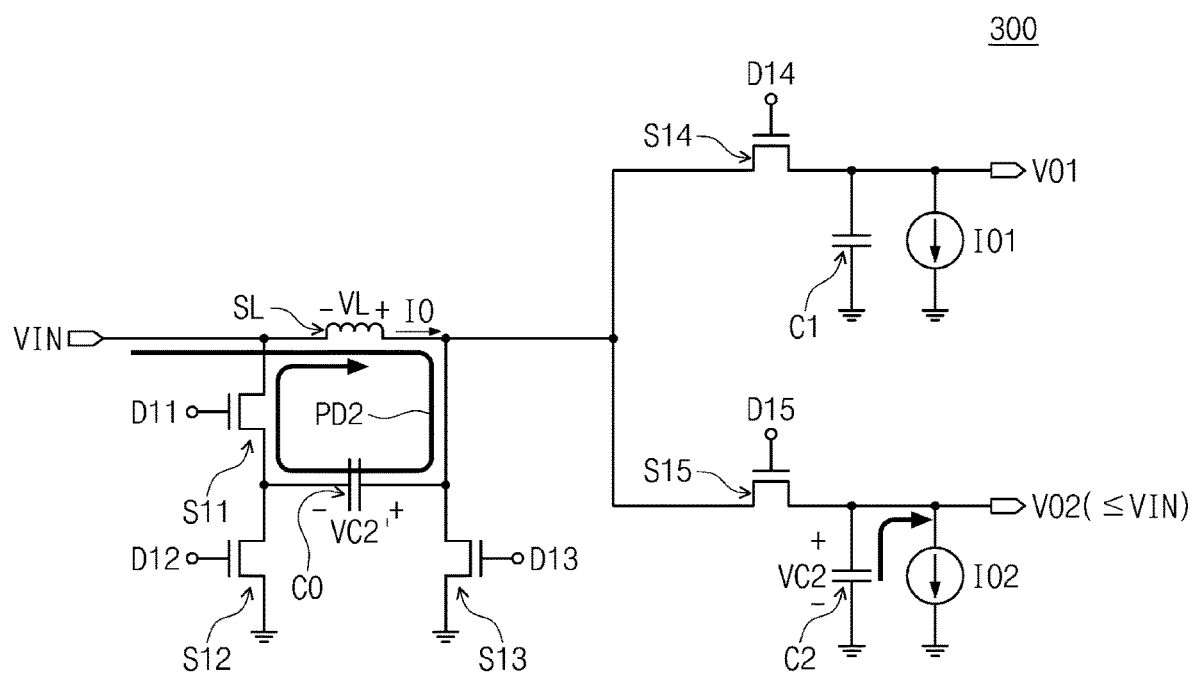

FIGS. 12 and 13 are conceptual diagrams for describing example operations of the electronic circuit 300 of FIG. 6. For example, FIGS. 12 and 13 may be associated with a case where the voltage level of the output voltage VO2 is lower than the voltage level of the input voltage VIN (e.g., a case where the electronic circuit 300 performs a function of a buck converter with regard to the output voltage VO2).

FIG. 12 illustrates a first state of buck conversion. In the first state of the buck conversion, a current path PD1 may be provided. Along the current path PD1, the current I0 may flow through the inductive element SL based on the input voltage VIN.

For example, the switch element S15 may be connected. Along the current path PD1, the current I2 may flow through the switch element S15 based on the current I0. Accordingly, the input voltage VIN may be converted to the output voltage VO2 based on the current I0 and the current I2.

The current path PD1 may include the switch element S15. When the current I0 and the current I2 flow through the inductive element SL and the switch element S15, the flow of the current I0 and the current I2 may not pass through a switch element other than the switch element S15. Accordingly, when the switch element S15 provides the current path PD1, the current path PD1 for the current I0 and the current I2 may not include another switch element other than the switch element S15.

For example, the switch element S12 may be connected, and may provide a portion of the current path PD1 (or an addition current path). The portion of the current path PD1 (or the addition current path) may include the capacitive element C0 and the switch element S12. In the portion of the current path PD1 (or in the addition current path), a current which is based on the current I0 may flow to the reference voltage terminal through the capacitive element C0 and the switch element S12.

As the current I0 flows along the current path PD1, the voltage VL may be applied between both ends of the inductive element SL. In addition, the capacitive element C2 may store charges, and a voltage VC2 may be applied between both ends of the capacitive element C2. As the voltage VL is applied, the voltage VC2 may have a voltage level lower than the voltage level of the input voltage VIN.

The voltage VC2 may be output as the output voltage VO2. Accordingly, the output voltage VO2 may be converted from the input voltage VIN such that the voltage level of the output voltage VO2 is lower than the voltage level of the input voltage VIN.

As the switch elements S12 and S15 are connected, the capacitive element C0 and the capacitive element C2 may be connected in parallel between the second end of the inductive element SL and the reference voltage. Accordingly, charges may be shared between the capacitive element C0 and the capacitive element C2, and the voltage VC2 may be applied between both ends of the capacitive element C0. In this case, the voltage VC2 between both ends of the capacitive element C0 may correspond to the output voltage VO2. It may be understood that the energy of the inductive element SL is transferred to the output circuit 340 in the first state of the buck conversion.

FIG. 13 illustrates a second state of the buck conversion. In the second state of the buck conversion, a current path PD2 may be provided. For example, the switch element S11 may be connected. Along the current path PD2, the current I0 may flow through the inductive element SL, the capacitive element C0, and the switch element S11 based on the input voltage VIN. Meanwhile, the switch element S15 may not be connected, and may not provide a current path.

The current I0 flowing through the inductive element SL, the capacitive element C0, and the switch element S11 may flow through the inductive element SL again. The inductive element SL, the capacitive element C0, and the switch element S11 may constitute a loop path. The switch element S11 may provide the loop path for the current I0. The current I0 may flow along the loop path which includes the inductive element SL, the capacitive element C0, and the switch element S11. The current I0 may freewheel through the inductive element SL.

As the current I0 flows along the current path PD2, a voltage VC2' may be applied between both ends of the capacitive element C0 and the voltage VL may be applied between both ends of the inductive element SL. It may be understood that the energy of the inductive element SL is transferred to the capacitive element C0 in the second state of the buck conversion. As the current I0 flows along the loop path, an amount of energy stored in the inductive element SL may decrease, and an amount of energy stored in the capacitive element C0 may increase.

The voltage VC2 between both ends of the capacitive element C2 may be provided as a source of the output voltage VO2 and the current I02. The charges stored in the capacitive element C2 in the first state of the buck conversion may be used to output the output voltage VO2. When the current I0 flows along the loop path, the output voltage VO2 may be output based on the energy stored in the capacitive element C2.

When the buck conversion is required with regard to the output voltage VO2, the second state of FIG. 13 may be first provided. In the second state of the buck conversion, as the current I0 freewheels, the energy of the inductive element SL may be transferred to the capacitive element C0, and the voltage VC2' between both ends of the capacitive element C0 may increase. Afterwards, the first state of FIG. 12 may be provided. In the first state of the buck conversion, the energy which is based on the increased voltage VC2' may be transferred to an output terminal (e.g., to the capacitive element C2), and the voltage VC2 may be applied between both ends of the capacitive element C2. As will be described with reference to FIG. 15, the second state and the first state may be alternately repeated, and thus the output voltage VO2 may be output to have a voltage level lower than the voltage level of the input voltage VIN.

Figures 14, 15:
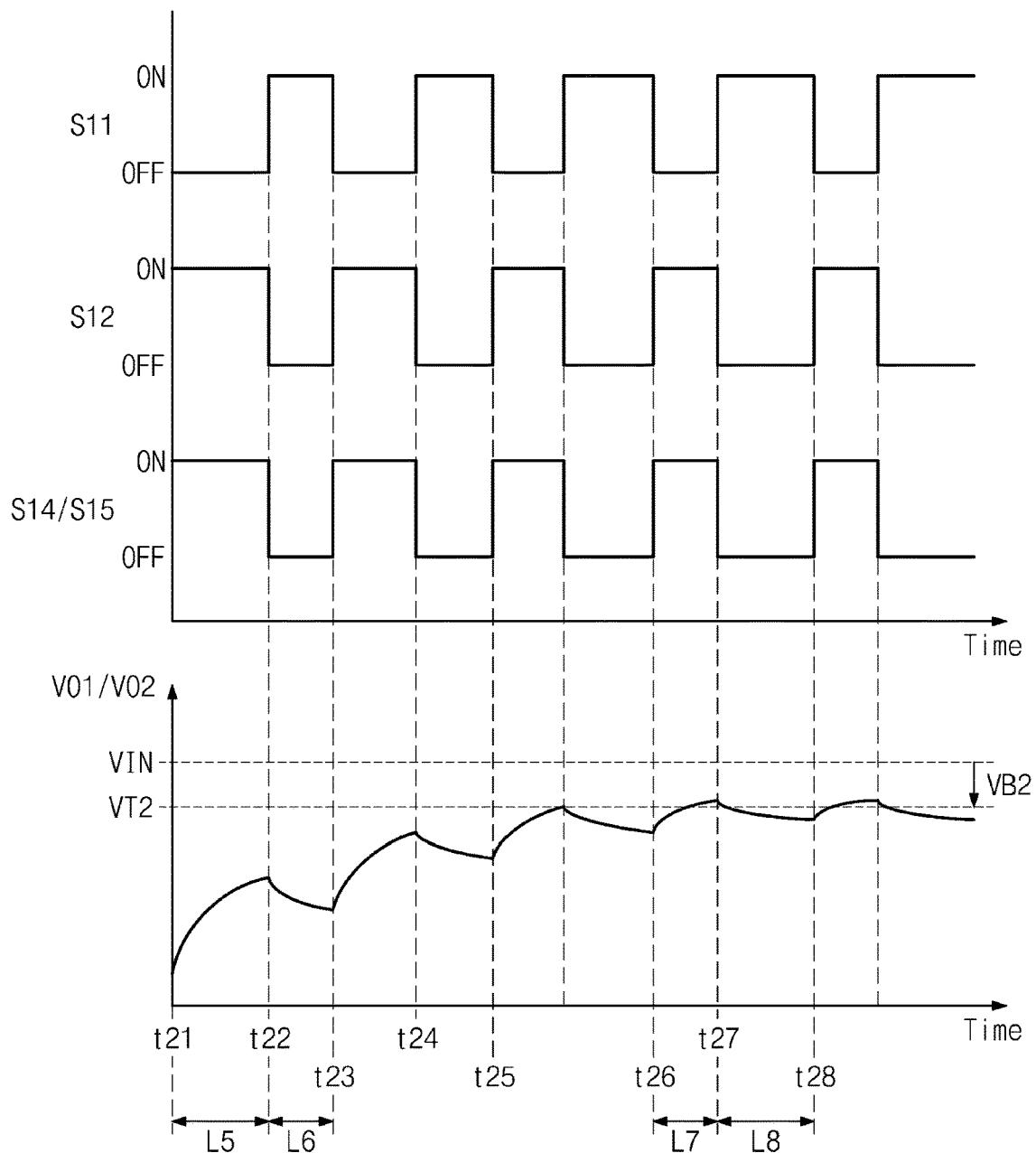
FIG. 14 is a table describing example operations of FIGS. 12 and 13.
FIG. 15 is a timing diagram for describing example operations of FIGS. 12 and 13.

FIG. 14 is a table describing the example operations of FIGS. 12 and 13.

In the first state of the buck conversion, the current path PD1 may be provided (Refer to FIG. 12). To this end, the switch element S11 may be disconnected or turned off, and the switch elements S12 and S15 may be connected or turned on. In the second state of the buck conversion, the current path PD2 may be provided (Refer to FIG. 13). To this end, the switch element S11 may be connected or turned on, and the switch elements S12 and S15 may be disconnected or turned off.

FIGS. 12 and 13 have been referenced to describe the buck conversion associated with the output voltage VO2. However, the electronic circuit 300 may also perform a function of buck conversion associated with the output voltage VO1. For example, when the switch element S11 is disconnected and the switch elements S12 and S14 are connected, a current path may be provided similar to the current path PD1. For example, when the switch element S11 is connected and the switch elements S12 and S14 are disconnected, the current path PD2 may be provided.

In the buck conversion, while the current path PD1 is provided, the voltage level of the output voltage VO1 or VO2 may increase. On the other hand, while the current path PD2 is provided, the voltage level of the output voltage VO1 or VO2 may decrease. This will be further described with reference to FIG. 15.

An operation of the switch element S13 may be variously changed or modified to provide the current paths PD1 and PD2. For example, while the electronic circuit 300 performs the buck conversion associated with the output voltage VO2, the operation of the switch element S13 may be suitably controlled depending on a type of voltage conversion associated with the output voltage VO1.

FIG. 15 is a timing diagram for describing the example operations of FIGS. 12 and 13.

Although not illustrated in FIG. 15, first, before time t21, the switch element S11 may be connected, the switch element S12 may be disconnected, and the switch element S14 or S15 may be disconnected. In this case, as the current IO0 freewheels, the capacitive element C0 may store energy transferred from the inductive element SL.

For example, between time t21 and t22, the switch element S11 may be disconnected, the switch element S12 may be connected, and the switch element S14 or S15 may be connected. In this case, the energy of the inductive element SL may be transferred to the output circuit 330 or 340. Accordingly, the voltage level of the output voltage VO1 or VO2 may increase (the first state of the buck conversion).

For example, between time t22 and t23, the switch element S11 may be connected, the switch element S12 may be disconnected, and the switch element S14 or S15 may be disconnected. In this case, charges stored in the capacitive element C1 or C2 may be used to output the output voltage VO1 or VO2. As the capacitive element C1 or C2 is discharged, the voltage level of the output voltage VO1 or VO2 may decrease (the second state of the buck conversion). Meanwhile, the capacitive element C0 may store energy transferred from the inductive element SL.

In such a manner, the voltage level of the output voltage VO1 or VO2 may repeat an increase and a decrease alternately. For example, the voltage level of the output voltage VO1 or VO2 may increase between time t23 and t24, and the voltage level of the output voltage VO1 or VO2 may decrease between time t24 and t25.

As the voltage level of the output voltage VO1 or VO2 varies, the voltage level of the output voltage VO1 or VO2 may reach near an intended voltage level VT2 (e.g., at time t26). The intended voltage level VT2 may be a voltage level required by a component of the electronic device 1000, and may be lower by a decrement VB2 than the voltage level of the input voltage VIN.

As the voltage level of the output voltage VO1 or VO2 repeats an increase and a decrease continuously, the voltage level of the output voltage VO1 or VO2 may be maintained near the intended voltage level VT2. For example, the voltage level of the output voltage VO1 or VO2 may increase between time t26 and t27, and the voltage level of the output voltage VO1 or VO2 may decrease between time t27 and t28. However, the voltage level of the output voltage VO1 or VO2 may not be greatly out of the intended voltage level VT2.

As the first state of the buck conversion and the second state of the buck conversion are alternately repeated, the voltage level of the output voltage VO1 or VO2 may be maintained near the intended voltage level VT2. In addition, the voltage-second balance may be maintained at both ends of the inductive element SL.

As described with reference to FIG. 11, a direction where the voltage level of the output voltage VO1 or VO2 varies may be controlled by adjusting a ratio of a length of a time period where the voltage level of the output voltage VO1 or VO2 increases to a length of a time period where the voltage level of the output voltage VO1 or VO2 decreases. For example, a ratio of a time length L5 to a time length L6 may be greater than a ratio of a time length L7 to a time length L8. Between time t21 and t23, the voltage level of the output voltage VO1 or VO2 may have an increasing tendency. Between time t26 and t28, the voltage level of the output voltage VO1 or VO2 may have a maintaining tendency.

It has been described with reference to FIGS. 6 to 15 that the voltage level of the output voltage VO1 becomes higher than the voltage level of the input voltage VIN and the voltage level of the output voltage VO2 becomes lower than the voltage level of the input voltage VIN. However, the description is provided to facilitate better understanding, and is not intended to limit the present disclosure. Each of the output circuits 330 and 340 may provide buck conversion or boost conversion independently and selectively. The output circuits 330 and 340 may provide the same type of voltage conversion or may provide different types of voltage conversion.

Figures 16, 17:
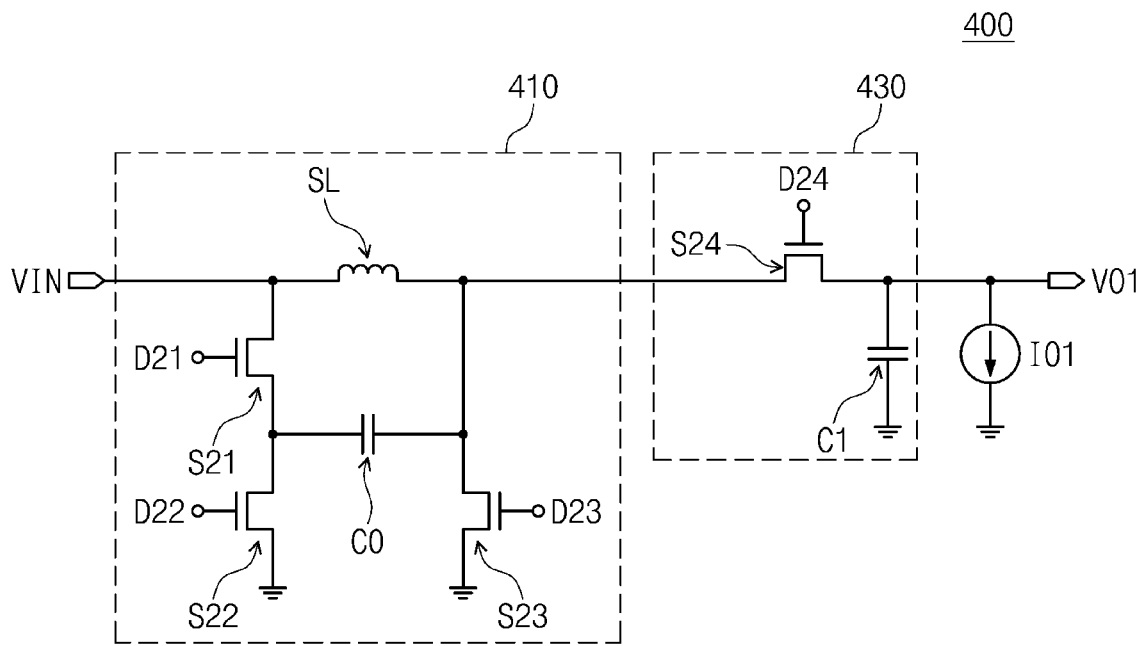
FIG. 16 is a conceptual diagram illustrating an example configuration implemented with an electronic circuit of FIG. 3 according to some example embodiments.
FIG. 17 is a table describing example operations of an electronic circuit of FIG. 16.

FIG. 16 is a conceptual diagram illustrating an example configuration implemented with the electronic circuit 100 of FIG. 3 according to some example embodiments. In some example embodiments, the electronic circuit 100 of FIG. 3 may be implemented with an electronic circuit 400 of FIG. 16.

The electronic circuit 400 may include a conversion circuit 410 and an output circuit 430. The conversion circuit 410 and the output circuit 430 may correspond to the conversion circuit 110 and the output circuits 130, 140, and 150 of FIG. 3.

The conversion circuit 410 may include switch elements S21, S22, and S23. Each of the inductive element SL and the capacitive element C0 may be included in the conversion circuit 410, or may be a discrete element which is disposed outside a chip or package including the electronic circuit 400 and is connected to the electronic circuit 400 through a pad or pin. The output circuit 430 may include a switch element S24 and the capacitive element C1.

The switch elements S21 to S24 may be connected (or turned on) or disconnected (or turned off) in response to control signals D21 to D24 respectively. The switch elements S21 to S24 may correspond to the switch elements S11 to S14 described with reference to FIGS. 6 to 15. For brevity, a redundant description will be omitted below.

The configurations and the operations associated with the SIDO buck-boost converter have been described with reference to FIGS. 6 to 15. However, example embodiments of the present disclosure may be employed in a single-output buck-boost converter as illustrated in FIG. 16.

FIG. 17 is a table describing example operations of the electronic circuit 400 of FIG. 16.

In a first state of boost conversion, the switch elements S21, S22, and S23 may be disconnected or turned off, and the switch element S24 may be connected or turned on. In this case, similar to the current path PU1 of FIG. 8, a current path from the input voltage VIN to the output voltage VO1 may be provided. As energy of the inductive element SL is transferred to the output circuit 430, the voltage level of the output voltage VO1 may increase.

In a second state of the boost conversion, the switch elements S21, S22, and S24 may be disconnected or turned off, and the switch element S23 may be connected or turned on. In this case, similar to the current path PU2 of FIG. 9, a current path from the input voltage VIN to the reference voltage terminal through the switch element S23 may be provided. As the capacitive element C1 is discharged, the voltage level of the output voltage VO1 may decrease.

As the first state of the boost conversion and the second state of the boost conversion are alternately repeated, the electronic circuit 400 may convert the input voltage VIN to the output voltage VO1. Similar to those described with reference to FIG. 11, the output voltage VO1 may be converted from the input voltage VIN such that the voltage level of the output voltage VO1 is higher than the voltage level of the input voltage VIN.

In a first state of buck conversion, the switch elements S21 and S23 may be disconnected or turned off, and the switch elements S22 and S24 may be connected or turned on. In this case, similar to the current path PD1 of FIG. 12, a current path from the input voltage VIN to the output voltage VO1 may be provided, and a current path from the input voltage VIN to the reference voltage terminal through the capacitive element C0 and the switch element S22 may be provided. As energy of the capacitive element C0 is transferred to the output circuit 430, the voltage level of the output voltage VO1 may increase.

In a second state of the buck conversion, the switch elements S22, S23, and S24 may be disconnected or turned off, and the switch element S21 may be connected or turned on. In this case, similar to the current path PD2 of FIG. 13, a loop path may be provided through the inductive element SL, the capacitive element C0, and the switch element S21. As the capacitive element C1 is discharged, the voltage level of the output voltage VO1 may decrease.

As the first state of the buck conversion and the second state of the buck conversion are alternately repeated, the electronic circuit 400 may convert the input voltage VIN to the output voltage VO1. Similar to those described with reference to FIG. 15, the output voltage VO1 may be converted from the input voltage VIN such that the voltage level of the output voltage VO1 is lower than the voltage level of the input voltage VIN.

According to the example embodiments described with reference to FIGS. 6 to 17, a current path from the input voltage VIN to the output voltage VO1, VO2, or VOn may include one switch element. Accordingly, a current may flow through one switch element.

For example, referring to FIG. 6, while the current I0 and the current I1 or I2 flow from a terminal of the input voltage VIN to a terminal of the output voltage VO1 or VO2, the current I0 and the current I1 or I2 may flow through only one switch element S14 or S15. For example, referring to FIG. 16, while a current flows from the terminal of the input voltage VIN to the terminal of the output voltage VO1, the current may flow through only one switch element S24.

According to the configuration of FIGS. 4 and 5, a current may flow through two switch elements S1 and S4 or S1 and S5. Accordingly, compared to the configuration of FIGS. 4 and 5, the example embodiments of FIGS. 6 to 17 may minimize an amount of power consumed by a switch element. As a result, the example embodiments of FIGS. 6 to 17 may improve efficiency of voltage conversion.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above descriptions are intended to provide example configurations and operations for implementing the present disclosure. The scope and spirit of the present disclosure may include implementations which are obtained by simply changing or modifying the above example embodiments, in addition to the above-described example embodiments. Also, the scope and spirit of the present disclosure includes implementations which are accomplished by easily changing or modifying the above-described example embodiments afterwards.

What is claimed is:

1. An electronic circuit, comprising:
    an inductive element having a first end directly connected to an input voltage and a second end;
    a first capacitive element having a first end and a second end, wherein the second end of the first capacitive element is directly connected to the second end of the inductive element;
    a first switch element having a first end directly connected to the first end of the inductive element and the input voltage, and a second end directly connected to the first end of the capacitive element;
    a second switch element having a first end directly connected to the second end of the first switch element and the first end of the capacitive element, and a second end directly connected to a reference voltage;
    a third switch element connected between the second end of the inductive element and the reference voltage;
    a fourth switch element connected between the second end of the inductive element and a first output voltage; and
    a fifth switch element connected between the second end of the inductive element and a second output voltage.

2. The electronic circuit of claim 1, wherein the first and second output voltages are converted from the input voltage such that each of a first voltage level of the first output voltage and a second voltage level of the second output voltage is higher or lower than a voltage level of the input voltage.

3. The electronic circuit of claim 1, wherein when current flows through the inductive element and the fourth switch element, the first output voltage is converted from the input voltage based on the current.

4. The electronic circuit of claim 3, wherein when the current flows through the inductive element and the fourth switch element, the current does not pass through another switch element.

5. The electronic circuit of claim 1, further comprising:
a second capacitive element connected between a first end of the fourth switch element and the reference voltage, wherein
a second end of the fourth switch element is connected to the second end of the inductive element.

6. The electronic circuit of claim 5, wherein when current flows through the second and fourth switch elements, the first capacitive element and the second capacitive element are connected in parallel between the second end of the inductive element and the reference voltage.

7. The electronic circuit of claim 1, wherein when current flows through the first switch element, the current flows along a loop path which includes the inductive element, the first capacitive element, and the first switch element.

8. The electronic circuit of claim 7, further comprising:
a third capacitive element connected between a first end of the fourth switch element and the reference voltage, wherein:
a second end of the fourth switch element is connected to the second end of the inductive element, and
when the current flows along the loop path, the first output voltage is output based on energy stored in the third capacitive element.

9. An electronic circuit, comprising:
a conversion circuit which includes an inductor which is directly connected to an input voltage, and a first capacitor which is directly connected to the inductor, wherein the inductor outputs a current through an inductive element based on the input voltage; and
a plurality of output circuits that output a plurality of output voltages based on the current, each of the plurality of output voltages having a voltage level higher or lower than a voltage level of the input voltage, wherein
when a first output circuit of the plurality of output circuits outputs a first output voltage having a voltage level lower than the voltage level of the input voltage, the voltage level of the first output voltage decreases as the current flows along a loop path which includes the inductive element and the first capacitor, and the voltage level of the first output voltage increases as the current is transferred to the first output circuit, and
the conversion circuit further includes:
a first switch element having a first end directly connected to the inductor and the input voltage, and a second end directly connected to the first capacitor;
a second switch element having a first end directly connected to the first switch element and the first capacitor, and a second end directly connected to a reference voltage; and
a third switch element having a first end directly connected to the inductor, and a second end directly connected to the reference voltage, the first output circuit includes:
a fourth switch element having a first end directly connected to the inductor and the first capacitor, and a second end directly connected to the first output voltage; and a second capacitor connected between the second end of the fourth switch element and the reference voltage,
when the current flows through the second and fourth switch elements, the first capacitor and the second capacitor are connected in parallel between the inductor and the reference voltage.

10. The electronic circuit of claim 9, wherein when the voltage level of the first output voltage is lower than the voltage level of the input voltage and the voltage level of the first output voltage increases, a voltage between both ends of the second capacitor corresponds to the first output voltage.

11. The electronic circuit of claim 9, wherein:
the fourth switch element selectively provides or does not provide a current path for the current, and
when the voltage level of the first output voltage is lower than the voltage level of the input voltage and the fourth switch element provides the current path, the voltage level of the first output voltage increases.

12. The electronic circuit of claim 9, wherein:
the fourth switch element selectively provides or does not provide a current path for the current, and
when the fourth switch element provides the current path, the current path does not include another switch element.

13. The electronic circuit of claim 9, wherein:
the fourth switch element that selectively provides or does not provide a current path for the current, and
when the voltage level of the first output voltage is lower than the voltage level of the input voltage and the fourth switch element does not provide the current path, the voltage level of the first output voltage decreases.

14. The electronic circuit of claim 9, wherein as the current flows along the loop path, an amount of energy stored in the inductive element decreases.

15. The electronic circuit of claim 9, wherein a second output circuit of the plurality of output circuits outputs a second output voltage having a voltage level higher or lower than the voltage level of the input voltage, regardless of whether the voltage level of the first output voltage is higher or lower than the voltage level of the input voltage.

16. An electronic circuit comprising:
a conversion circuit that outputs a first current through an inductive element based on an input voltage; and
a first switch element that selectively provides or does not provide a current path for the first current and a second current which is based on the first current and outputs an output voltage having a voltage level higher or lower than a voltage level of the input voltage, wherein:
the current path includes the first switch element and does not include another switch element, and
when the voltage level of the output voltage is lower than the voltage level of the input voltage and the first switch element does not provide the current path, the first current freewheels through the inductive element.

17. The electronic circuit of claim 16, wherein:
a first end of the inductive element is connected to a first end of a capacitive element,
a second end of the inductive element is connected to the input voltage, and
the conversion circuit comprises a second switch element connected between the second end of the inductive element and a second end of the capacitive element.

18. The electronic circuit of claim 17, wherein the first current freewheels as flowing along a loop path which includes the inductive element, the capacitive element, and the second switch element.

19. The electronic circuit of claim 16, wherein:
a first end of the inductive element is connected to a first end of a capacitive element,
a second end of the inductive element is connected to the input voltage, and
the conversion circuit comprises a third switch element connected between a second end of the capacitive element and a reference voltage.

20. The electronic circuit of claim 19, wherein when the voltage level of the output voltage is lower than the voltage level of the input voltage and the first switch element provides the current path, the second current flows through the first switch element and a third current which is based on the first current flows through the capacitive element and the third switch element.

* * * * *